(12) United States Patent
Norman

(10) Patent No.: US 8,474,174 B2
(45) Date of Patent: Jul. 2, 2013

(54) BAITED LURE

(76) Inventor: Ray Lee Norman, Seaside, OR (US)

( * ) Notice: Subject to any disclaimer, the term of this patent is extended or adjusted under 35 U.S.C. 154(b) by 167 days.

(21) Appl. No.: 12/924,938

(22) Filed: Oct. 9, 2010

(65) Prior Publication Data
US 2011/0277371 A1 Nov. 17, 2011

Related U.S. Application Data

(60) Provisional application No. 61/280,159, filed on Oct. 30, 2009.

(51) Int. Cl.
*A01K 85/01* (2006.01)
*A01K 85/10* (2006.01)
*A01K 85/00* (2006.01)

(52) U.S. Cl.
USPC ....... 43/42.06; 43/44.87; 43/44.92; 43/42.22; 43/42.23; 43/44.83; 43/44.99; 43/42.36; 43/42.05

(58) Field of Classification Search
USPC ............. 43/4, 42, 42.05, 42.06, 42.36, 44.99, 43/44.87, 44.83, 44.9, 44.91, 42.22, 42.23
See application file for complete search history.

(56) References Cited

U.S. PATENT DOCUMENTS

| | | | | |
|---|---|---|---|---|
| 2,512,002 A | * | 6/1950 | Wardrip | 43/44.87 |
| 2,983,065 A | * | 5/1961 | Ferguson et al. | 43/42.09 |
| 2,994,982 A | * | 8/1961 | Murawski | 43/35 |
| 3,205,608 A | * | 9/1965 | Dickinson | 43/42.23 |
| 3,505,754 A | * | 4/1970 | Lawlor | 43/42.22 |
| 3,654,724 A | * | 4/1972 | Charron | 43/42.06 |
| 3,670,447 A | * | 6/1972 | Wohead | 43/43.14 |
| 4,205,476 A | * | 6/1980 | Hsu | 43/42.06 |
| 4,642,933 A | * | 2/1987 | Brown | 43/42.36 |
| 4,777,757 A | * | 10/1988 | de Marees van Swinderen | 43/41 |
| 5,131,183 A | * | 7/1992 | Thayer et al. | 43/43.11 |
| 5,172,510 A | * | 12/1992 | Lovell, Jr. | 43/42.36 |
| 5,224,285 A | * | 7/1993 | Kamin et al. | 43/42.06 |
| 5,265,368 A | * | 11/1993 | Taylor | 43/42.06 |
| 5,603,182 A | * | 2/1997 | Wilson | 43/44.99 |
| 5,638,630 A | * | 6/1997 | Volaski | 43/41 |
| 6,105,299 A | * | 8/2000 | Rich | 43/15 |
| 6,588,138 B1 | * | 7/2003 | Gilbert | 43/42.06 |
| 7,043,870 B1 | * | 5/2006 | Sydow | 43/44.99 |
| 7,174,669 B1 | * | 2/2007 | Kallas | 43/42.06 |
| 2006/0143971 A1 | * | 7/2006 | Mitchell et al. | 43/42.06 |
| 2006/0218848 A1 | * | 10/2006 | Melhorn et al. | 43/44.99 |

* cited by examiner

*Primary Examiner* — Darren W Ark
*Assistant Examiner* — Marc Burgess
(74) *Attorney, Agent, or Firm* — Francis I. Gray

(57) ABSTRACT

An improved baited lure has a head section and a tail section so that when press fitted together an interior chamber with scent holes is formed for containing bait or scent and/or a rattle. A fish hook is attached to a leader that runs through holes in the head and tail sections so that, as the lure is moved through water, the two sections are held together. One section may have an air pocket for buoyancy when at rest, and a tether may be connected between the two sections so that, in the event the leader is broken, the lure rises to the surface of the water and, even if separated, both sections are retrievable.

5 Claims, 3 Drawing Sheets

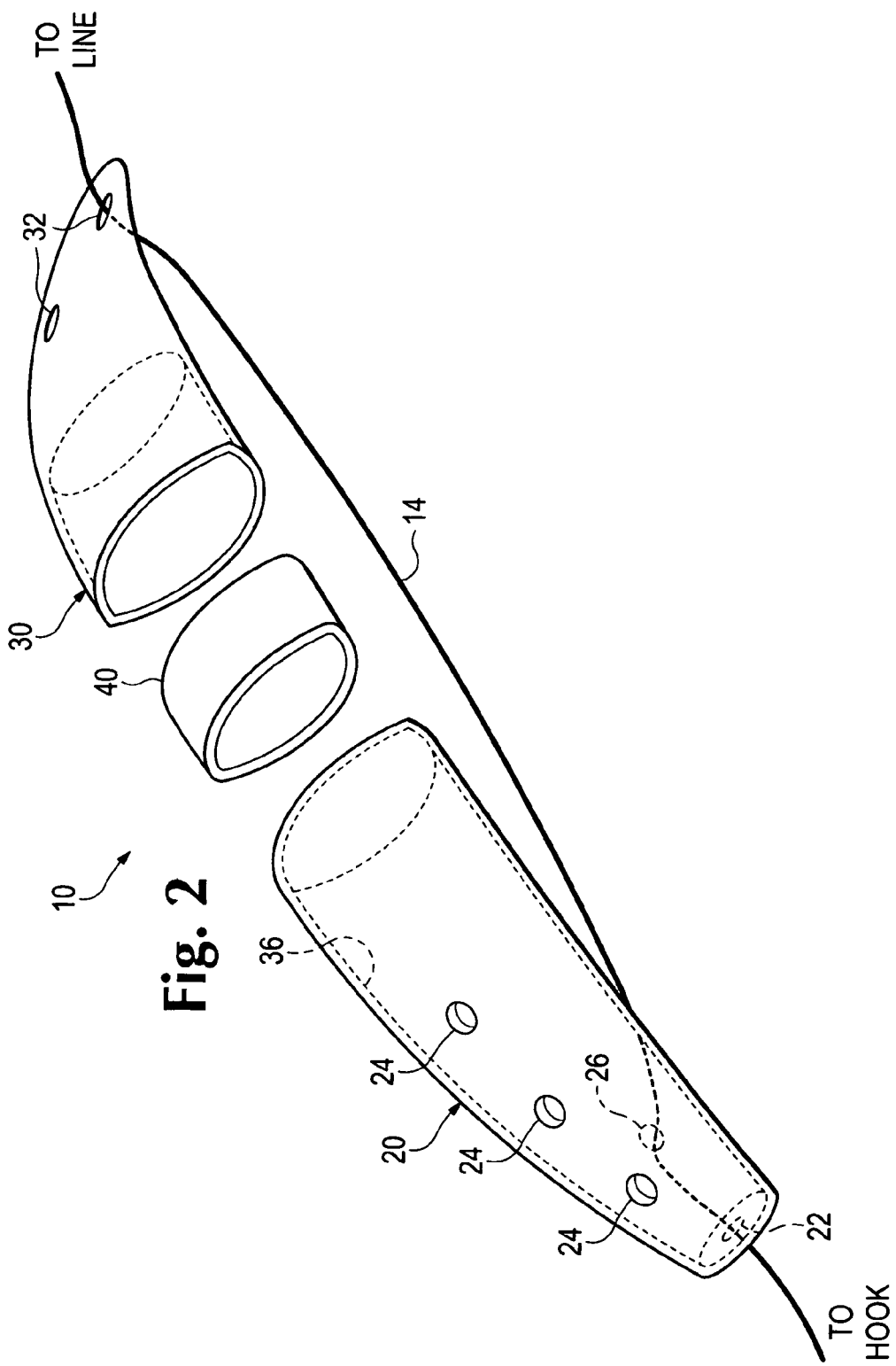

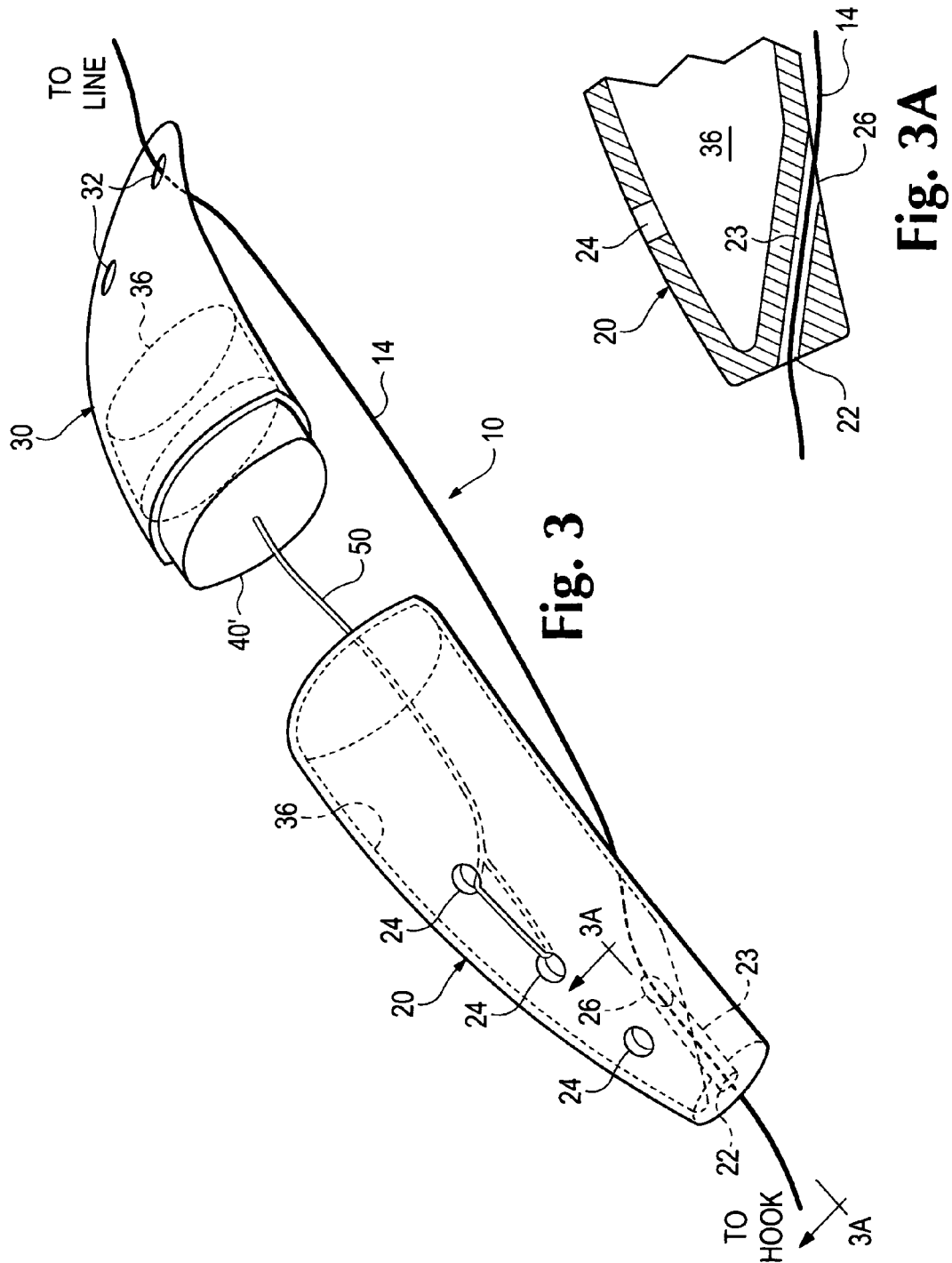

BAITED LURE

CROSS-REFERENCE TO RELATED APPLICATIONS

The present application claims the filing date of Provisional U.S. Patent Application Ser. No. 61/280,159 filed Oct. 30, 2009 entitled "An Improved Baited Lure", which Provisional Patent Application is incorporated herein by reference and hereby expressly abandoned upon the filing of the present application.

BACKGROUND OF THE INVENTION

The present invention relates to fishing equipment, and more particularly to an improved baited lure for attracting fish.

Lures for fishing generally are designed to attract the attention of particular fish, and may be designed to spin as they pass through the water. Each lure has a body that is attached to a fishing line via a leader. Also attached to the lure, or to the leader, is a fish hook for snaring the fish in the mouth. Bait may be attached to the hook, so that the combination of the attractiveness of the lure and the scent from the bait brings the fish to "strike" the lure and/or bait and swallow the fish hook. The fish hook, due to its barbs, does not allow the fish to escape so that the fish may be reeled in by the fisherman.

Some lures are hollow so that the bait may be inserted within a scent or bait chamber in the lure itself. These lures have two sections that are secured together by some type of locking device once the bait is inserted within the chamber of the lure. Holes in the body of the lure allow the scent of the bait to escape into the water from the chamber to further attract the fish. The lures are attached to the leader together with the fish hook, or the fish hook may be integral with a portion of the lure.

One such baited lure is shown in FIG. 1. A tail portion has a central hole through which a leader may extend to connect to a fish hook. A head portion includes an extension of the tail portion and a hinged segment, the region between the extension and hinged segment forming the scent or bait chamber when the hinged segment is closed with the extension. A protrusion and a node on the hinged section allow the leader to be led from the tail portion to the line. The fish hook may alternatively be coupled to the leader at the protrusion. When the hinged segment is closed, it is secured to the extension of the tail portion with some sort of snap device, such as a rubber band.

In any of these prior lures, if the leader breaks for any reason while in the water, the lure may be lost. Also having to unlock the two sections to access the scent or bait chamber means it takes longer to rebait the lure when reusing.

What is desired is an improved baited lure that uses a simple mechanism for staying together while in the water, while being easy to retrieve and rebait.

BRIEF SUMMARY OF THE INVENTION

Accordingly the present invention provides an improved baited lure having a head section and a tail section that are press fitted together to form an interior chamber within which scent or bait may be placed. Holes in the respective sections allow the scent of the bait to escape from the lure into the water to attract fish. Rather than using a locking device to secure the head and tail sections of the lure together, a leader is run through holes in the head and tail portions, completely bypassing the interior chamber, to a fish hook at the end of the tail section of the lure. When press fitted together, the water action around the lure as the lure moves through the water keeps the two sections together.

The walls of the tail section and/or the head section may be hollow as well to form air pockets. This allows the lure to float to the surface of the water when not in motion. By attaching a tether between the sections, in the event the leader breaks so the leader is no longer connected to the fishing line and the sections become separated, one section floats to the surface of the water so the entire lure may be retrieved for reuse.

The advantages and other novel features of the present invention are apparent from the following detailed description when read in conjunction with the attached drawing and appended claims.

BRIEF DESCRIPTION OF THE SEVERAL VIEWS OF THE DRAWING

FIG. 2 is an exploded, perspective view of an improved baited lure according to the present invention.

FIG. 3 is an exploded, perspective view of another embodiment of the improved baited lure according to the present invention.

FIG. 3a is a cross-sectional view of a portion of the improved baited lure of FIG. 3 taken along line A-A according to the present invention.

DETAILED DESCRIPTION OF THE INVENTION

Figure 1:
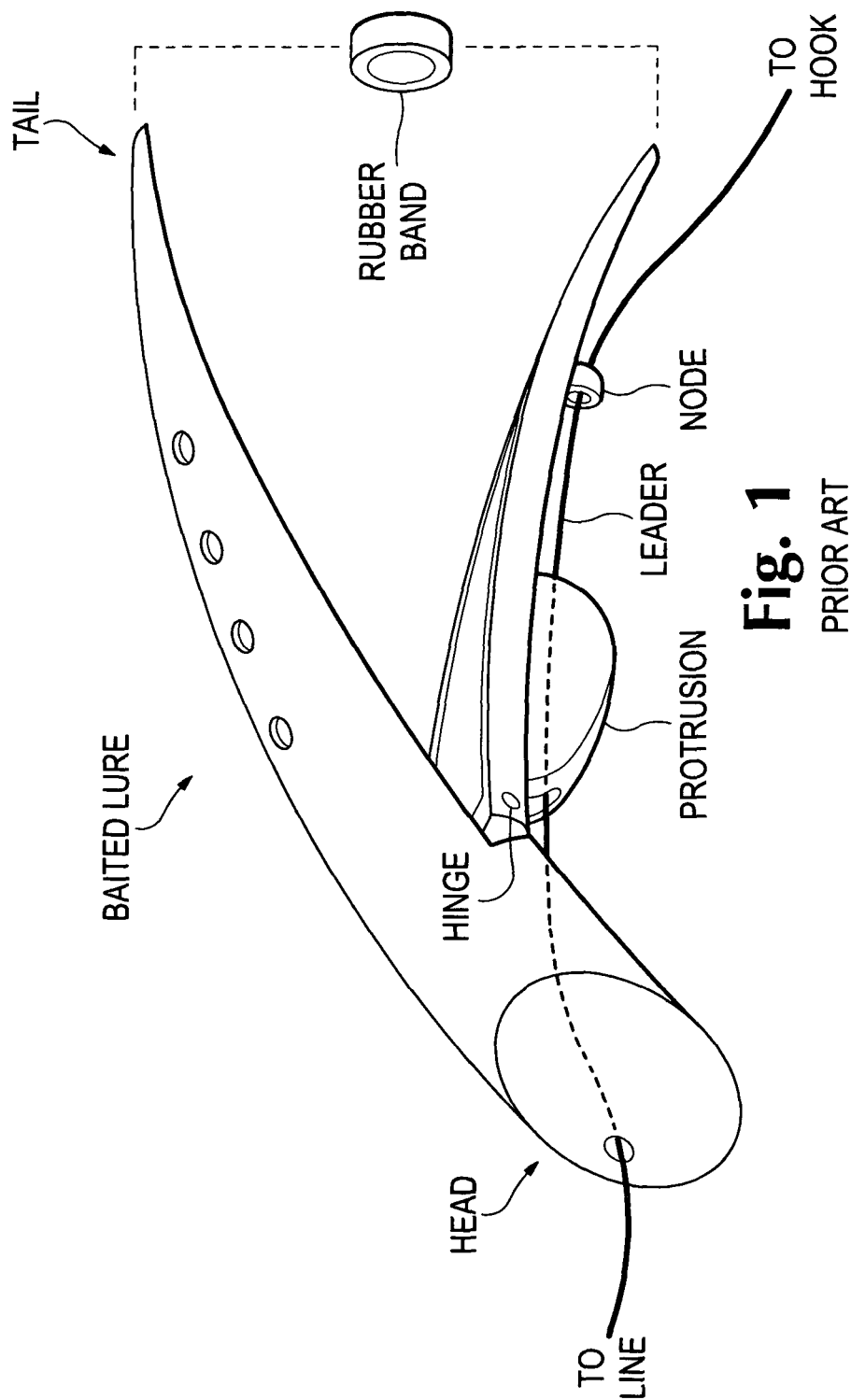
FIG. 1 is a perspective view of a prior art baited lure.

Referring now to FIG. 2 an improved baited lure 10 of the spinning variety is shown having a tail section 20 and a head section 30. A fish hook (not shown) is attached to a leader 14 at the back of the tail section 20, the leader being threaded through a hole 22 in the end of the tail section and a hole 26 on the underside of the tail section. The tail section 20 is hollow to form a bait/scent chamber and has scent holes 24 that extend from the interior to the exterior. The leader 14 then is threaded through one of two or more holes 32 in the head section 30 for attachment to a fishing line (not shown). The selected hole 32 for the leader 14 to pass through the head section 30 determines the direction of spin for the shown lure 10, and/or an amount of wiggle or vibration for the lure depending upon the positioning of the selected hole. The head section 30 also is hollow to form an air chamber within which a rattle or noise making device may be inserted, or to form a larger bait/scent chamber for the bait or scent when connected with the tail section 20. As an integral part of the head section 30, or as a separate piece, a press connector 40 is formed to fit snugly between the sections as a press fit so that when the sections are fitted together there is an interior chamber within which bait or scent may be placed. There is no mechanical locking mechanism required between the head and tail sections 30, 20 as the water, pushing against the head section when moving through the water, keeps the lure 10 firmly against a recommended bead in front of the hook. This, combined with the friction fit of the press connector 40, make it virtually impossible for the sections 20, 30 to come apart during normal fishing use. The press connector 40 may be hollow, as shown, to provide the larger bait scent chamber, or may be solid to form the air chamber 36 in the head section 30, as discussed below with respect to FIG. 3. As is apparent, the lure 10, when threaded onto the leader 14, is free to spin or vibrate about the circumference of the leader, i.e., the leader is not fixedly attached to the lure.

When the two sections 20, 30 are press fitted together using the press connector 40, and with bait within the bait/scent chamber and the fish hook at the back of the tail section tied to the fishing line via the leader 14 through the two sections, the lure 10 is ready for use. When cast into the water and reeled through the water, the motion of the lure 10 through the water keeps the two sections 20, 30 together without the need of a locking device, as indicated above. Yet when reused, the lure 10 readily is separated into its two sections 20, 30 for rebaiting or rescenting.

As shown in FIG. 3 the head section 30 may form the air chamber as an integral air pocket 36 in the underside. The air pocket 36 makes the head section 30 buoyant. A tether 50 may be permanently attached between the two sections 20, 30, either on the exterior or interior (as shown). In the unlikely event the two sections 20, 30 do get separated, or the leader is broken, while in the water, the buoyant head section 30 floats to the surface of the water and is retrievable, together with the tail section 20 which is attached by the tether 50. Alternatively the air pocket 36 may be in the tail section 20, or both sections may be provided with air pockets for buoyancy when the lure 10 is not being towed through the water. In this embodiment the press connector 40' is a solid, integral part of the head section 30 and forms one end of the air chamber 36, although it may be a separate component that is solid rather than having a central hole as discussed above.

FIGS. 3 and 3a illustrate how the leader 14 is threaded through a passage 23 in the tail section 20. The passage 23 extends from the underside hole 26 to the hole 22 in the end of the tail section 20. In this way the leader 14 bypasses the interior bait chamber.

Further the bait/scent or air chamber of the lure 10 may also be used to contain a rattle, which may merely be small balls that knock together as the lure is towed through the water, especially for spinning lures. The noise thus created may be an additional attraction for the fish.

Thus the present invention provides an improved baited lure that has two sections that are press fitted together to form an interior chamber for containing bait or scent such that the lure is held together by motion through the water without requiring a secure attachment mechanism. Also a tether between the sections together with a buoyant chamber in one or both sections allows the lure to be readily retrieved if the leader to which the lure is attached breaks.

What is claimed is:

1. An improved baited lure of the type having a head section and a tail section which, when joined together, form a bait/scent chamber for containing bait or scent, wherein the improvement comprises:

a press fit connector for securing the head and tail sections together; and a leader threaded through the head and tail sections such that the sections stay together when moving through water, the leader being attached to a line at one end of the improved baited lure and to a fish hook at the other end of the improved baited lure such that the lure is free to spin about the leader;

wherein the tail section has a hollow body including an enclosed end with a leader hole and including an open end for interacting with the press fit connector, the hollow body further having an underside leader hole and having one or more scent holes in the open end with the leader being threaded through the enclosed end leader hole and the underside leader hole toward the head section; and wherein the head section has a partially hollow body including a solid end with at least two leader holes and including an open end for interacting with the press fit connector to secure the head and tail sections together, the leader being threaded from the tail section through one of the head section leader holes according to a desired movement for the lure through water without entering the head section open end, completely bypassing the bait/scent chamber.

2. The improved baited lure of claim 1 further comprising:

an air pocket in one of the sections to provide buoyancy; and a tether coupled between the sections so that the sections are joined even when no longer secured by the press fit connector.

3. The improved baited lure of claim 2 wherein the press fit connector comprises a short, solid section configured to tightly fit into open ends of the head and tail sections for securing the head and tail sections together so that the bait/scent chamber is in one of the head and tail sections and the air pocket is in the other one of the head and tail sections.

4. The improved baited lure of claim 3 wherein the press fit connector comprises a solid section integral with the end of one of the head and tail sections, the solid section having an extended portion that interacts with an open end of the other one of the head and tail sections for securing the head and tail sections together.

5. The improved baited lure of claim 1 wherein the press fit connector comprises a short, hollow tube configured to tightly fit interior to the open ends of the head and tail sections to secure the head and tail sections together.

* * * * *